Sept. 3, 1946.   J. M. STRANG ET AL   2,407,187
RANGEFINDER, HEIGHTFINDER, AND LIKE OPTICAL MEASURING INSTRUMENT
Filed Dec. 1, 1944
FIG: 1.
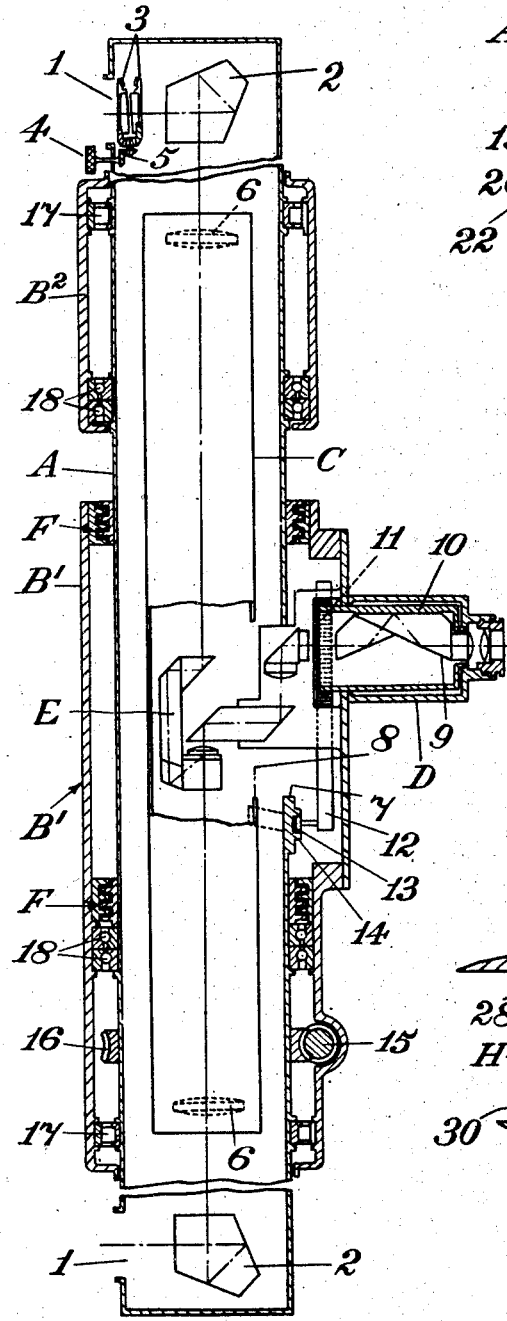
FIG: 2.
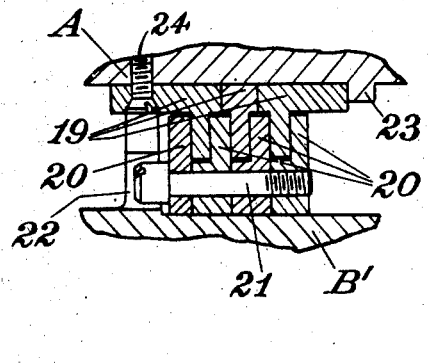
FIG: 3.
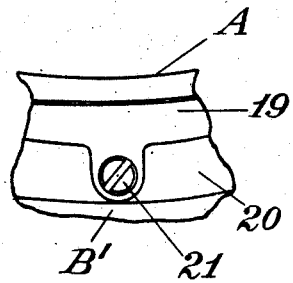
FIG: 4.
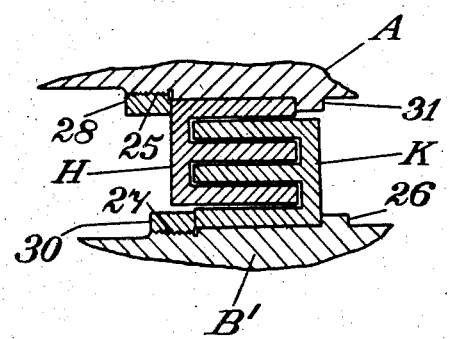
JOHN MARTIN STRANG
CLAUD FOSTER
INVENTORS,
By Cushman, Darby Cushman
ATTORNEYS Patented Sept. 3, 1946

2,407,187

UNITED STATES PATENT OFFICE 2,407,187

RANGE FINDER, HEIGHT FINDER, AND LIKE OPTICAL MEASURING INSTRUMENT

John Martin Strang and Claud Foster, Glasgow, Scotland, assignors to Barr & Stroud, Limited, Glasgow, Scotland Application December 1, 1944, Serial No. 566,222
In Great Britain March 14, 1941

7 Claims. (Cl. 88—2.7)

This invention refers to rangefinders, height-finders, and like optical measuring instruments of the self-contained base type, hereinafter referred to as rangefinders. Such instruments comprise a tubular base casing, light entrance windows, one at or near each end of the base casing, and two end reflectors within the base casing, to receive light entering through the windows and to direct it along the base casing by way of an objective to a central reflecting system at or near the middle of the base casing. The central reflecting system then directs the two beams of light at or approximately at right angles to the base to an eyepiece or to binocular eyepieces, there being in one or both beams of light a movable light deviating prism element by movement of which measurement is effected.

The present invention is concerned with what may be termed fixed eyepiece rangefinders, i. e. instruments in which the eyepiece (or eyepieces) remains stationary while the line of sight from the instrument to the object under observation is elevated or depressed, in contradistinction to the type of instrument in which movement of the instrument necessary for elevation or depression of the line of sight involves corresponding inclinational movement of the eyepiece.

With fixed eyepiece instruments, light has to pass from the rotatable base casing to the stationary eyepiece, and there must therefore be a light transmitting aperture in the wall of the base casing large enough to allow the light to pass for all relative positions of the base casing and eyepiece. It is not desirable to close this aperture with a glass panel, and the problem thus arises of sealing the interior of the instrument against the entrance of moisture from the atmosphere and against the entrance of other foreign matter, without applying undue resistance to the turning of the base casing.

According to this invention, a fixed eyepiece rangefinder has its tubular base casing rotatably carried in a coaxial stationary bearing tube which extends in the axial direction from one side of the base casing aperture to the other and which carries the fixed eyepiece arrangement, the base casing being supported in the bearing tube by anti-friction bearings, such as ball or roller bearings, or both, and the bearing tube and the tubular base casing being engaged with one another on each side of the base casing aperture by means of an annular tongue and groove arrangement which constitutes a sealing labyrinth as distinct from a bearing.

Preferably the sealing labyrinths are located at positions such that they are interposed between the bearings and the base casing aperture, so that they serve as a seal against the entry of oil or grease from the bearings as well as sealing the interior from the atmosphere.

In carrying the invention into practice, each labyrinth may be built up of a series of rings fitted around and turning with the base casing and a series of rings fitted inside of and remaining stationary with the bearing tube, the rings when assembled side by side forming annular tongues and grooves engaging with one another. The labyrinth generally has its tongues and grooves at right angles to the axis of the base casing, but they may be parallel with or at intermediate inclinations to that axis.

Two examples of fixed eyepiece rangefinders of the coincidence type in accordance with the invention will now be described with reference to the accompanying drawing, in which:

Figure 1 is a plan view of the rangefinder partly in section, and

Figures 2 and 3 are views on a larger scale, showing details of construction for a first example, and Figure 4 illustrates a second example.

Referring to Figure 1, the instrument comprises a tubular base casing A, an outer tubular bearing which is in two portions $B^1$, $B^2$, an inner frame tube C within the tubular base casing A, and an eyepiece mounting D carried by the portion $B^1$ of the outer bearing. The base casing A has light entrance windows 1, at each end, end pentagonal prisms 2, one at each end, a pair of rotatable measuring prisms 3 just inside the right hand window 1, an operating head 4, and bevel gears 5 through the medium of which the prisms 3 can be simultaneously rotated by the same amount in opposite senses for range measurement purposes, by rotation of the head 4.

The tubular base casing A is rotatable about its axis within the bearing tubes $B^1$, $B^2$, and the inner frame C rotates with the base casing.

Near the ends of the inner frame C there are objectives 6 and at the centre there is a central reflecting prism combination E. In the base casing there is an aperture 7 and in the inner frame C there is an aperture 8.

Within the eyepiece mounting D there is an erecting prism 9 in a cylindrical prism carrier 10 which is rotatable about the eyepiece axis. For rotating this prism 9 a circular rack 11 is fitted to the end of the prism carrier 10, a straight slidable bar 12 with a rack portion engages with the rack 11, and the bar 12 has a roller 13 at one end which engages in turn with a helical or scroll-shaped cam 14 on the outside of the base casing A.

When the base casing A is turned in elevation by the observer by means of a worm shaft 15 passing through the bearing tube B¹ and engaging with a worm wheel 16 on the outside of the base casing A, the measuring prisms 3, their operating mechanism 4, 5, the end pentagonal prisms 2, the inner frame C, the objectives 6, and the central reflecting prism combination E turn in elevation with the base casing, and the eyepiece mounting D and prisms D¹ associated with the mounting D remain stationary. To preserve the two images in a constant attitude as seen by the observer, the erecting prism 9 is rotated by the mechanism 11, 12, 13 and 14 about the axis of the eyepiece at half the angular speed of the base casing A.

In order to seal the interior of the instrument the following arrangement is adopted:

The base casing A is carried within the two tube parts B¹ and B² by means of roller bearings 17 and ball bearings 18. These bearings take all the weight of the rotating parts. The part B¹ extends over the aperture 7 and at two spaced positions, one on each side of the aperture 7, labyrinth sealing arrangements F are provided between the tube B¹ and the base casing A. These are not bearings but seals. A series of annular tongues extending around and turning with the tubular base casing A engages with a series of annular grooves on the inside of the tube B¹, which grooves remain stationary with the tube B¹.

Figures 2 and 3 show in detail one construction of the labyrinth sealing arrangement F. The tongues and grooves are built up of a series of metal rings 19, 20, locked in place as shown. A stud 21 passes axially through the rings 20 and its head is engaged with a recess in a flange 22 on the inside of the bearing tube B¹ so that slight freedom is allowed for axial movement of the rings 20. The rings 19 are held by a set screw 24 against an abutment 23. The faces of the rings at right angles to the axis are carefully made to contact evenly, with a film of oil between them without exerting any appreciable drag on the turning of the base casing.

Whereas in the construction shown in Figures 1, 2 and 3, the tongues and grooves of the labyrinth are at right angles to the axis of the base casing, in Figure 4 they are parallel with that axis. Figure 4 is a sectional view corresponding with Figure 2. For this construction, the base casing A has an external annular flange or shoulder 31 similar to the shoulder 23 of Figure 2 and in addition has an external screw-threaded portion 25. The bearing tube B¹ has an internal annular flange or shoulder 26 and an internal screw-threaded portion 27. To make up the labyrinth, two grooved metal rings H and K are used, adapted to engage with one another, the ring H fitting around the base casing A and being clamped between the flange 31 and a screw locking ring 28, while the ring K fits into the bearing tube B¹ and is clamped between the flange 26 and a screw locking ring 30.

We claim:

1. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, the tongue element and groove element thereof being relatively movable in rotating the base casing.

2. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, the said tongue and groove arrangements being interposed at axial positions between the anti-friction bearings and the base casing aperture, the tongue element and groove element thereof being relatively movable in rotating the base casing.

3. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, each tongue and groove arrangement being built up of a series of rings fitted round and turning with the base casing and a series of rings fitted inside and remaining stationary with the bearing tube, the rings when assembled forming annular tongues and grooves engaging with one another.

4. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, each tongue and groove arrangement being built up of a series of rings fitted round and turning with the base casing and a series of rings fitted inside and remaining stationary with the bearing tube, the rings when assembled forming annular tongues and grooves at right angles to the axis of the base casing and engaging with one another.

5. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, each tongue and groove arrangement being built up of a series of rings fitted round and turning with the base casing and a series of rings fitted inside and remaining stationary with the bearing tube, the rings when assembled forming annular tongues and grooves parallel with the axis of the base casing and engaging with one another.

6. A fixed eyepiece rangefinder according to claim 4, in which one of the two series of rings is in itself free for limited movement axially relative to the tubular element with which said series of rings is associated but is held against rotation relative to said tubular element.

7. A fixed eyepiece rangefinder comprising a tubular base casing, a stationary bearing tube coaxial with the base casing and in which the base casing is rotatably carried, an eyepiece carried by the bearing tube, the bearing tube extending in the axial direction from one side to the other of an aperture provided in the base casing for the passage of light from the interior of the base casing to the eyepiece, anti-friction bearings by means of which the base casing is rotatably carried in the bearing tube, and, on each side of the said aperture, an annular tongue and groove arrangement which constitutes a sealing labyrinth as distinct from a bearing, each tongue and groove arrangement being built up of a series of separate rings fitted around and turning with the base casing and a series of separate rings fitted inside and remaining stationary with the bearing tube, the rings when assembled forming annular tongues and grooves engaging with one another.

MARTIN STRANG.
CLAUD FOSTER.